(12) United States Patent
Kim et al.

(10) Patent No.: US 12,050,140 B2
(45) Date of Patent: Jul. 30, 2024

(54) THERMOCOUPLE WAFER CALIBRATION SYSTEM AND CALIBRATION METHOD USING THE SAME

(71) Applicant: KOREA RESEARCH INSTITUTE OF STANDARD AND SCIENCE, Daejeon (KR)

(72) Inventors: Yong-Gyoo Kim, Daejeon (KR); Su Yong Kwon, Daejeon (KR); Sang Wook Lee, Daejeon (KR); Sungjun Lee, Daejeon (KR); Sunghun Kim, Daejeon (KR); Youngseok Lee, Daejeon (KR)

(73) Assignee: KOREA RESEARCH INSTITUTE OF STANDARD AND SCIENCE, Daejeon (KR)

( * ) Notice: Subject to any disclaimer, the term of this patent is extended or adjusted under 35 U.S.C. 154(b) by 84 days.

(21) Appl. No.: 18/079,082

(22) Filed: Dec. 12, 2022

(65) Prior Publication Data

US 2024/0142318 A1 May 2, 2024

(30) Foreign Application Priority Data

Nov. 2, 2022 (KR) .................. 10-2022-0144696

(51) Int. Cl.
- *G01K 15/00* (2006.01)
- *G01K 1/022* (2021.01)
- *G01K 7/02* (2021.01)

(52) U.S. Cl.
CPC .......... *G01K 15/005* (2013.01); *G01K 1/022* (2013.01); *G01K 7/023* (2013.01)

(58) Field of Classification Search
CPC ...... G01K 15/005; G01K 1/022; G01K 7/023; G01K 7/01; G01K 1/026; G01K 7/02;
(Continued)

(56) References Cited

U.S. PATENT DOCUMENTS

| | | | | |
|---|---|---|---|---|
| 5,265,957 A | * | 11/1993 | Moslehi | G01J 5/53 |
| | | | | 250/252.1 |
| 2001/0012639 A1 | * | 8/2001 | Akram | G01K 1/026 |
| | | | | 438/18 |
| 2022/0059375 A1 | * | 2/2022 | Cheng | H01L 22/26 |

FOREIGN PATENT DOCUMENTS

| | | | |
|---|---|---|---|
| CN | 111024267 A | * | 4/2020 |
| KR | 1020040099926 A | | 12/2004 |

(Continued)

OTHER PUBLICATIONS

18079082_2024-04-23_KR_2616595_B1_H.pdf,Dec. 28, 2023.*
18079082_2024-04-24_CN_111024267_A_H.pdf,Apr. 17, 2020.*

*Primary Examiner* — Gail Kaplan Verbitsky
(74) *Attorney, Agent, or Firm* — NKL Law; Jae Youn Kim (57) ABSTRACT

The present disclosure relates to a thermocouple wafer calibration system including: a main body portion composed of a chamber forming a sealed space, and a support installed a lower edge of the chamber and supporting the chamber to be spaced apart from the ground; a thermocouple wafer composed of a plate installed to be horizontal inside the sealed space of the chamber, and a first thermocouple unit attached to a upper surface of the plate so as to form a plurality of first measurement contact points; a calibration portion provided with a second thermocouple unit penetrating the chamber in a space where the chamber spaced from the ground, then partially accommodated inside the sealed space, and calibrated to form a plurality of second measurement contact points in contact with a lower surface of the plate at a position corresponding to each of the first measurement contact points; a temperature measurement portion partially accommodated inside the sealed space of the chamber and measuring a temperature of the sealed space; a heating portion accommodated inside the sealed space of the (Continued)

chamber, allowing thermogenesis and being in thermal contact with the second thermocouple unit directly; a measurement portion connected to the first and second thermocouple units respectively, and measuring each thermal electromotive force for the first and second measurement contact points occurring when the first and second thermocouple units are in contact indirectly at both sides on the basis of the plate; and a temperature control portion calculating each temperature value for the first and second measurement contact points depending on values measured from the measurement portion, and, after comparing and analyzing the calculated temperature values and temperature values measured from the temperature measurement portion, allowing adjusting the temperature of the sealed space by controlling the heating portion based on the analysis result.

9 Claims, 7 Drawing Sheets

(58) Field of Classification Search
 CPC ............ G01K 1/14; G01K 15/00; G01K 7/13; G01K 7/021; G01K 7/028; G01K 7/00; G01K 7/015; G01K 7/04; G01K 1/024; G01K 1/08; G01K 13/00; G01K 13/02; G01K 13/20; G01K 7/16; G01K 7/22; G01K 7/42; G01K 1/16; G01K 3/005; G01K 7/18; G01K 2217/00; G01K 7/12; G01K 1/165; G01K 1/20; G01K 11/00; G01K 2211/00; G01K 7/32; G01K 7/425; G01K 7/427; G01K 1/18; G01K 11/006; G01K 17/00; G01K 17/20; G01K 1/143; G01K 15/007; G01K 17/003; G01K 2003/145; G01K 2007/422; G01K 2201/00; G01K 2219/00; G01K 3/04; G01K 5/486; G01K 7/026; G01K 7/183; G01K 7/34; G01K 7/343; G01K 1/00; G01K 1/02; G01K 1/028; G01K 1/146; G01K 11/12; G01K 11/125; G01K 11/18; G01K 11/32; G01K 11/324; G01K 13/024; G01K 13/223; G01K 17/06; G01K 2205/00; G01K 2207/00; G01K 2207/02; G01K 2215/00; G01K 3/14; G01K 5/00; G01K 7/003; G01K 7/10; G01K 7/14; G01K 7/186; G01K 7/21; G01K 7/226; G01K 7/24; G01K 7/245; G01K 7/25; G01K 7/346
 USPC ............................................ 374/178, 179, 1
 See application file for complete search history.

(56) References Cited

FOREIGN PATENT DOCUMENTS

| KR | 10-1057853 B1 | 8/2011 |
| KR | 1020210053713 A | 5/2021 |
| KR | 2616595 B1 * | 12/2023 |

* cited by examiner

THERMOCOUPLE WAFER CALIBRATION SYSTEM AND CALIBRATION METHOD USING THE SAME

BACKGROUND

Technical Field

The present disclosure relates to a thermocouple wafer calibration system in which a pre-calibrated thermocouple is installed perpendicularly in a lower part of a thermocouple wafer so as to physically contact a bottom surface of a measurement contact point of the thermocouple wafer with a measurement contact point of the calibrated thermocouple. Whereby, the measurement contact point of the thermocouple wafer is in contact with the calibrated thermocouple with a difference as much as the wafer's thickness, allowing minimizing a difference in the reference temperature value. Further, in this system, as an electric furnace driven by a conventional electric heater is adopted, the thermocouple wafer and the calibrated thermocouple are positioned inside the electric furnace simultaneously with installing individual devices for adjusting each height of the respective calibrated thermocouples allowing the measurement contact point of the thermocouple and the bottom surface of the thermocouple wafer to be in contact. Whereby, positions of all of the calibrated thermocouples are controllable individually, allowing locally performing measurement and adjustment of the temperature at a surface of the thermocouple wafer.

Related Art

Figure 1:
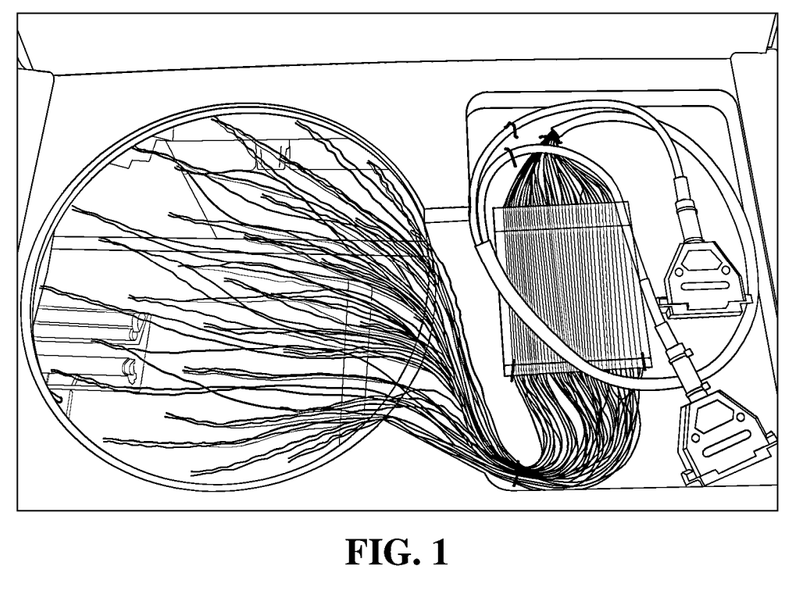
FIG. 1 is an image showing existing thermocouple wafer.

In general, as shown in FIG. 1, a thermocouple wafer forms multiple thermocouple contact points at a surface of a silicon wafer, allowing measuring the temperature at the surface of the wafer, and this is mainly used for measuring temperature gradient inside a semiconductor processing device.

The thermocouple wafer may be various according to types of substrates, including for example, $SiO_2$, SiN, etc. Types of thermocouples in use include type K thermocouple in a temperature range of 700° C. or less and type R or B thermocouple in a high temperature range of 1000° C. or more.

In this circumstance, in order to maintain high-precision required in the semiconductor processing, the thermocouple wafer should be used after calibrating an output temperature thereof. Generally, the output temperature is calibrated by a method of putting the thermocouple wafer in a high temperature chamber having a size large enough to install the same and verifying the output temperature of the thermocouple wafer read at a specific temperature.

However, the aforementioned method has drawbacks such as calibration inaccuracy resulting from poor temperature uniformity inside the high temperature chamber. Particularly, this is not allowable to accurately calibrate separate temperatures for each contact point formed in the thermocouple wafer. That is, whereby, it is allowable to perform calibration en bloc with only a value corresponding to whole average temperature, instead of estimating accuracies of the thermocouple wafer sensor contact points one by one.

Therefore, in order to solve the above-described drawbacks, it is demanded to develop such a technique capable of implementing a 1:1 contact method (point-to-point contact method) for calibration through a 1:1 match between multiple calibrated temperature sensors and multiple thermocouple wafer temperature contact points inside a chamber for calibration.

Prior Art Document

Patent Documents

Korean Patent No. 10-1057853 (SYSTEM AND PROCESS FOR CALIBRATING TEMPERATURE MEASUREMENT DEVICES IN THERMAL PROCESSING CHAMBERS)

SUMMARY

Technical Problem

Therefore, the present disclosure is contrived to solve conventional problems as described above, providing a thermocouple wafer calibration system in which a pre-calibrated thermocouple is installed perpendicularly in a lower part of a thermocouple wafer so as to physically contact a bottom surface of a measurement contact point of the thermocouple wafer with a measurement contact point of the calibrated thermocouple, and also providing a calibration method using the same.

Further, the present disclosure aims to provide a thermocouple wafer calibration system in which the measurement contact point of the thermocouple wafer is in contact with the calibrated thermocouple with a difference as much as the wafer's thickness, allowing minimizing a difference in the reference temperature value, and to provide a calibration method using the same.

Further, the present disclosure aims to provide a thermocouple wafer calibration system in which as an electric furnace driven by a conventional electric heater is adopted, the thermocouple wafer and the calibrated thermocouple are positioned inside the electric furnace simultaneously with installing individual devices for adjusting each height of the respective calibrated thermocouples allowing the measurement contact point of the thermocouple and the bottom surface of the thermocouple wafer to be in contact, and to provide a calibration method using the same.

Further, the present disclosure aims to provide a thermocouple wafer calibration system in which positions of all of the calibrated thermocouples are controllable individually, allowing locally performing measurement and adjustment of the temperature at a surface of the thermocouple wafer, and to provide a calibration method using the same.

Meanwhile, technical problems to be solved in the present disclosure are not limited to the aforementioned technical problems, and other technical problems, which are not mentioned above, will be apparently understood to a person having ordinary skill in the art from the following description.

Technical Solution

A thermocouple wafer calibration system according to an embodiment of the present disclosure to achieve the aims as described above may include: a main body portion composed of a chamber forming a sealed space, and a support installed a lower edge of the chamber and supporting the chamber to be spaced apart from the ground; a thermocouple wafer composed of a plate installed to be horizontal inside the sealed space of the chamber, and a first thermocouple unit attached to a upper surface of the plate so as to form a plurality of first measurement contact points; a calibration portion provided with a second thermocouple unit penetrating the chamber in a space where the chamber spaced from the ground, then partially accommodated inside the sealed space, and calibrated to form a plurality of second measurement contact points in contact with a lower surface of the plate at a position corresponding to each of the first measurement contact points; a temperature measurement portion partially accommodated inside the sealed space of the chamber and measuring a temperature of the sealed space; a heating portion accommodated inside the sealed space of the chamber, allowing thermogenesis and being in thermal contact with the second thermocouple unit directly; a measurement portion connected to the first and second thermocouple units respectively, and measuring each thermal electromotive force for the first and second measurement contact points occurring when the first and second thermocouple units are in contact indirectly at both sides on the basis of the plate; and a temperature control portion calculating each temperature value for the first and second measurement contact points depending on values measured from the measurement portion, and, after comparing and analyzing the calculated temperature values and temperature values measured from the temperature measurement portion, allowing adjusting the temperature of the sealed space by controlling the heating portion based on the analysis result. The second thermocouple unit may be composed of a plurality of second thermocouples, allowing adjusting each height thereof, and optionally separated from a lower surface of the plate.

Further, the calibration portion may further include a height adjustment unit installed in the space where the chamber is spaced apart from the ground, supporting a lower part of the second thermocouple so as to allow upward pressurization, and adjusting the each height of the second thermocouples individually depending on the pressurization or not.

Further, the height adjustment unit may include: a support panel installed spaced apart from the ground, forming a guide hole through which the second thermocouple passes movably up and downward; a couple of fixation bars extending downward from a bottom of the support panel at a position corresponding to the guide hole; a guider coupled to the fixation bar movably up and downward, wherein a lower end part of the second thermocouple is attached thereto; a separation panel coupled to a lower end of the fixation bar being perpendicular to the fixation bar; a bolt penetrating the separation panel and coupled to a lower end of the guider; and a nut coupled to a lower end part of the bolt on an opposite side where the guider is positioned on the basis of the separation panel, and either rising or descending a height of the bolt according to a rotation direction resulting from an external force as so to pressurize and move the guider and the second thermocouple en bloc, ultimately allowing adjusting the height of the second thermocouple.

Further, the height adjustment unit may further include: a quick connector having a block form and attached to the lower end of the second thermocouple; and a seating groove formed in the guider so as to correspond to the shape of the quick connector and on which the quick connector is seated.

Further, the height adjustment unit may further include an adjustment bar installed to an edge of the support panel, supporting the support panel to be spaced apart from the ground and allowing adjusting a height of the supported support panel.

Further, a range of changes in height by the nut in the height adjustment unit may be set to within 1 cm to 2 cm.

Further, the plate may be a circular silicon substrate having a diameter ranging from 200 mm to 300 mm, and the first and second measurement contact points may be arranged at a predetermined interval on the plate.

Further, arrangement of the first and second measurement contact points may be positioned on a concentric circle having respective radii, r1, r2 and r3, on the basis of a center. In a concentric circle having the radii, r1 and r2, the arrangement thereof may be positioned on the concentric circle at an angle interval of 45 degrees. In a concentric circle having the radius, r3, the arrangement thereof may be positioned on the concentric circle at an angle interval of 22.5 degrees. The radii r1 to r3 may be set corresponding to a size of the plate.

Further, when a diameter of the plate is 300 mm, the radii, r1, r2 and r3 may be set to 46.7 mm, 2×r1=93.4 mm and 32×r1=140.1 mm, respectively, and each number of the first and second measurement contact points and the second thermocouples may be maximum 33.

Meanwhile, a calibration method of an output temperature of a thermocouple wafer using a thermocouple wafer calibration system may include steps of: a) placing an arbitrary thermocouple wafer selected for test on a second measurement contact point, setting lead wires of the thermocouple wafer extending from a first thermocouple unit to be headed upward, allowing exposure thereof to the outside through a hole for lead wire provided in a chamber, and then individually connecting the lead wires to a lead wire connector; b) after adjusting directions and positions of first and second measurement contact points so as for 1:1 correspondence, fixing the thermocouple wafer to a horizontal support bar provided in a chamber so as not to change the adjusted directions and positions; c) adjusting each height of second thermocouples, confirming that the second measurement contact point is in contact with a lower surface of a plate of the thermocouple wafer, and confirming that the lead wires of the thermocouple wafer are electrically connected to the lead wire connector; d) after sealing the chamber, increasing a temperature of a sealed space inside the chamber to a test temperature, and when the temperature of the sealed space has reached to the test temperature, standing by until a middle temperature value of the second measurement contact point is stabilized; and e) after stabilization of the temperature value of the second measurement contact point, conducting a test in which a computer detects temperature values depending on positions of the first measurement contact point in order, as well as temperature values depending on positions of the second measurement contact point in order, and storing a result of the conducted test and using the stored result for data analysis.

Further, the step d) may be standing by until the temperature value of the second measurement contact point is stabilized within maximum −0.1° C. to +0.1° C. per hour. In the step c), detections of a series of temperature values depending on positions of the first and second measurement contact points may be repeated minimum 3 times individually.

Advantageous Effects

The thermocouple wafer calibration system and the calibration method using the same according to the present disclosure relate to a 1:1 direct calibration method between the first and second measurement contact points, allowing minimizing uncertainty of calibration and showing calibration effects on all of the first measurement contact points.

Further, even when 1:1 calibration is not available due to different positions of the first and second measurement contact points, the thermocouple wafer calibration system and the calibration method using the same according to the present disclosure allow estimating a temperature of an in-between position through insertion thereof in between the second thermocouples forming the second thermocouple unit. Whereby, it is capable of accomplishing calibration with less uncertainty and adjusting heights of all of the second thermocouples separately. Further, if necessary, at least a part of the second thermocouples are selected and then heights thereof are adjusted, allowing locally performing measurement and adjustment of the temperature at a surface of the thermocouple wafer and achieving precision calibration for the first measurement contact point of the thermocouple wafer.

In addition, according to the present disclosure, 2D temperature distribution is obtainable by using a plurality of the second thermocouples, allowing being widely applied to all thermocouple wafers having arbitrary shapes. Further, when putting the whole calibration system inside a vacuum chamber, feature testing of the thermocouple wafer is allowable under vacuum and under argon gas atmosphere.

Meanwhile, advantageous effects to be obtained in the present disclosure are not limited to the aforementioned effects, and other effects, which are not mentioned above, will be apparently understood to a person having ordinary skill in the art from the following description.

DETAILED DESCRIPTION

Hereinafter, embodiments of the present disclosure will be explained in detail with reference to the accompanying drawings in order to be easily implemented by those having ordinary knowledge in the art to which the present disclosure pertains. However, the following detailed description merely delineates the embodiments for structural or functional explanation of the present disclosure. Thus, it should be not interpreted that the scope of the present disclosure is limited to the embodiments explained in the specification. That is, since the embodiments are able to be modified variously and have a variety of forms, it should be understood that the scope of the present disclosure include equivalents capable of implementing the technical idea. Further, the objects or effects provided in the present disclosure do not mean that a particular embodiment includes either all of them or such effects only. Thus, it should be not understood that the scope of the present disclosure is limited thereto.

The terms used in the present disclosure should be understood as the followings.

Since the terms, such as "first", "second", etc., are used for distinguish one element from other elements, the scope of the present disclosure should be not limited thereto. For example, "a first element" may be referred to as "a second element" and similarly hereto, "a second element" may be referred to as "a first element". When mentioning that an element is "connected" to the other element, it may be connected directly thereto, however, it should be understood that there may be another element between them. Whereas, when mentioning that an element is "connected directly" to the other element, it should be understood that there may be not any other element between them. Meanwhile, it should be also understood in the same way as the above in case of expressions for explaining the relationship between elements, i.e. "between-" and "directly between-", or "adjacent to'-" and "adjacent directly to'-".

It should be understood that the singular expression includes the plural expression unless specifically stated otherwise. The terms, such as "comprise" and "have", etc., indicate the existences of the implemented features, numbers, steps, operations, elements, components or any of combinations thereof. It should be understood that they do not preclude the potential existences or additions of one or more features, numbers, steps, operations, elements, components or any of combinations thereof.

Unless otherwise defined, all terms used herein have the same meanings as those commonly understood by those having ordinary knowledge in the art to which the present disclosure pertains. It should be understood that the terms defined in commonly used dictionaries, should be interpreted to be consistent with the meanings contextually stated in the field of relevant art and will not be interpreted to have idealized or excessively formalistic senses unless explicitly defined in the present disclosure.

Figure 2:
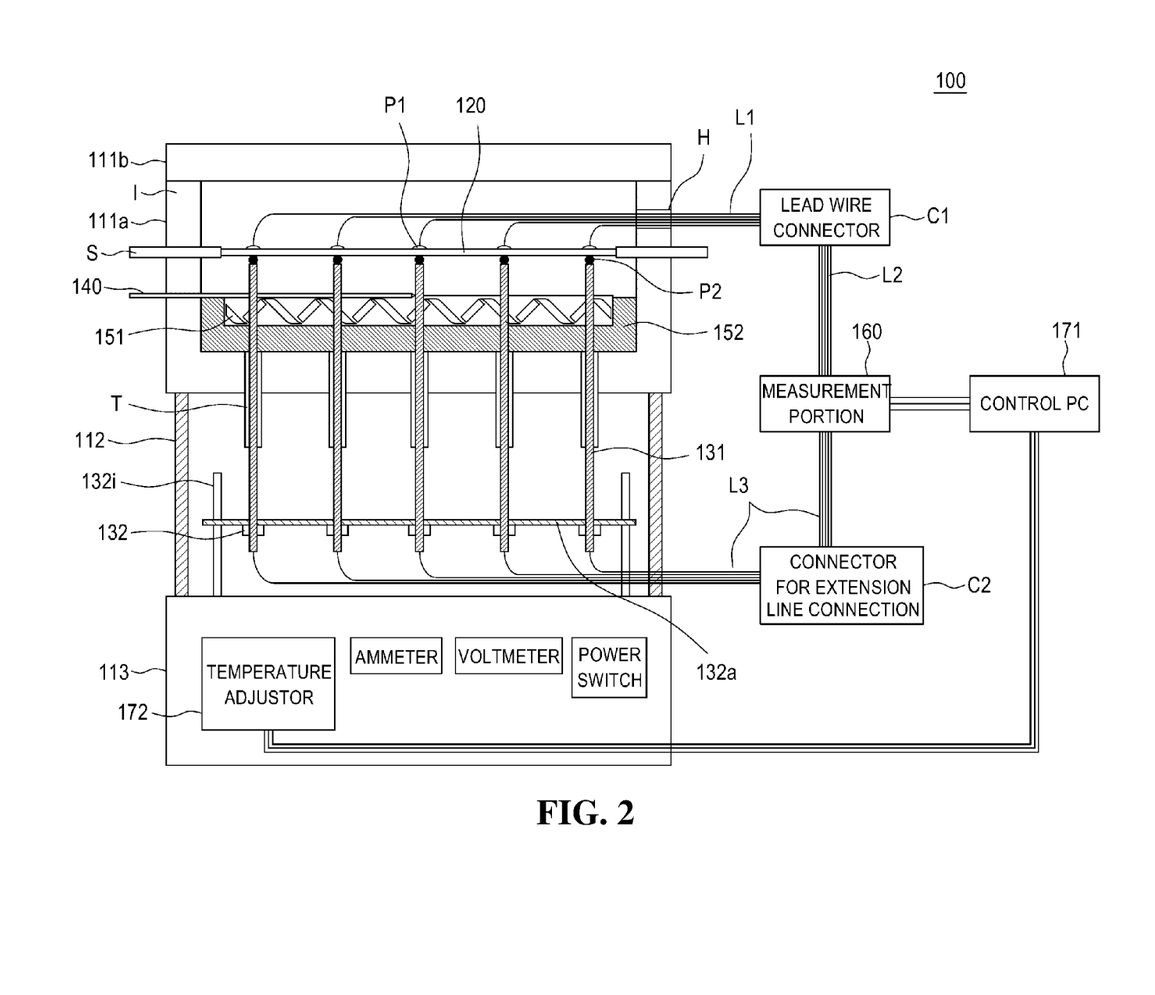
FIG. 2 is a schematic view showing configuration of a thermocouple wafer calibration system according to an embodiment of the present disclosure.
Figure 3:
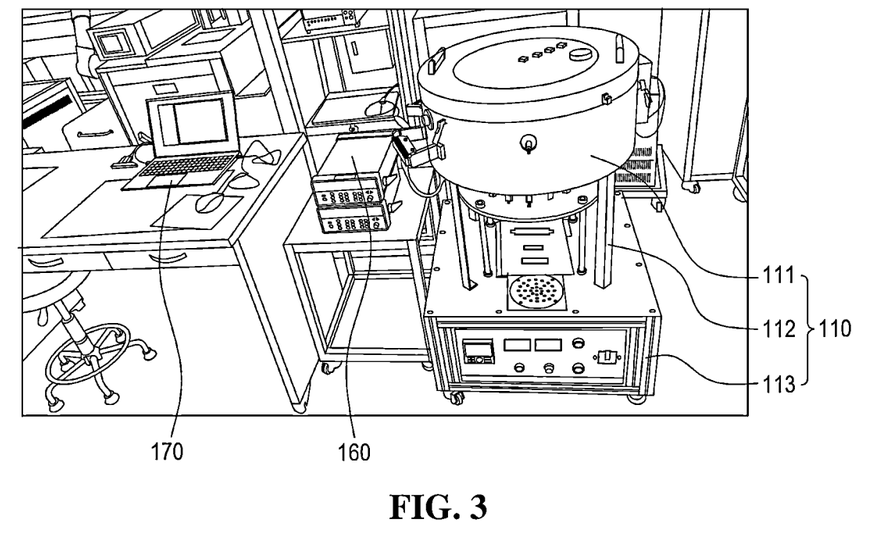
FIG. 3 is an exemplary image showing actual use of the thermocouple wafer calibration system according to FIG. 2.
Figure 4:
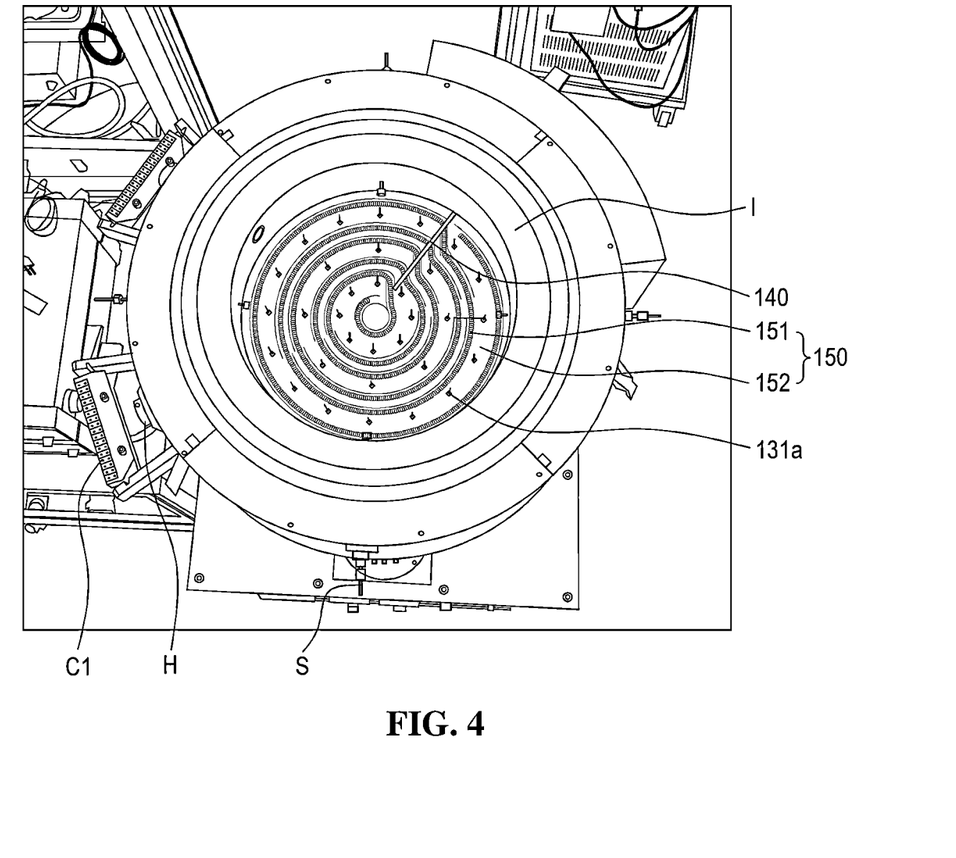
FIG. 4 is an image showing the inside of a chamber in the thermocouple wafer according to FIG. 3.
Figure 5:
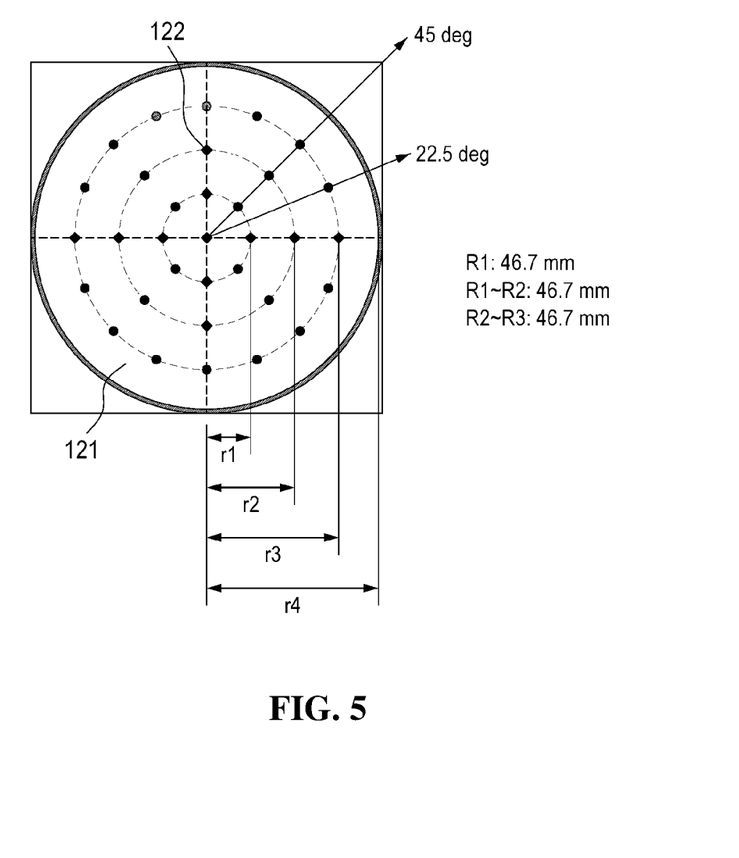
FIG. 5 is a drawing showing arrangement of first and second measurement contact points and second thermocouples on a thermocouple wafer in a thermocouple wafer calibration system.
Figure 6A:
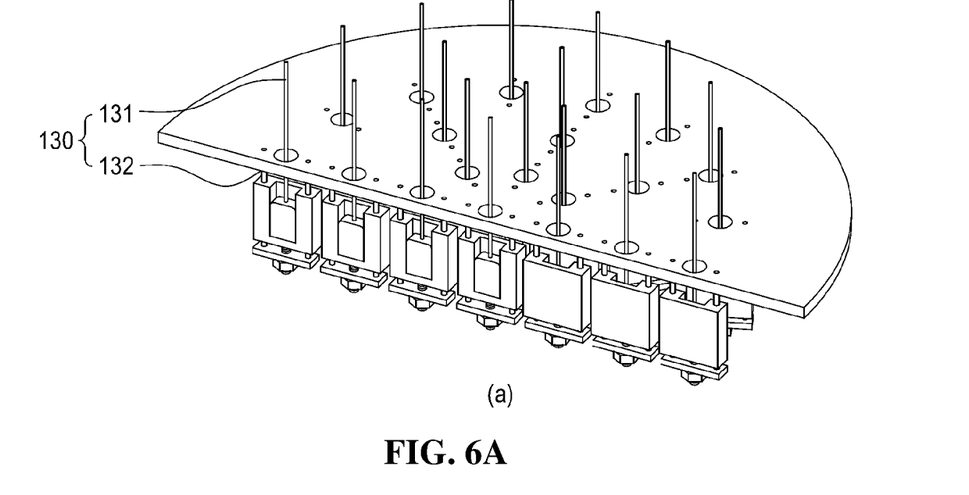
FIGS. 6A and 6B are drawings showing configuration of a height adjustment unit in a thermocouple wafer calibration system.
Figure 6B:
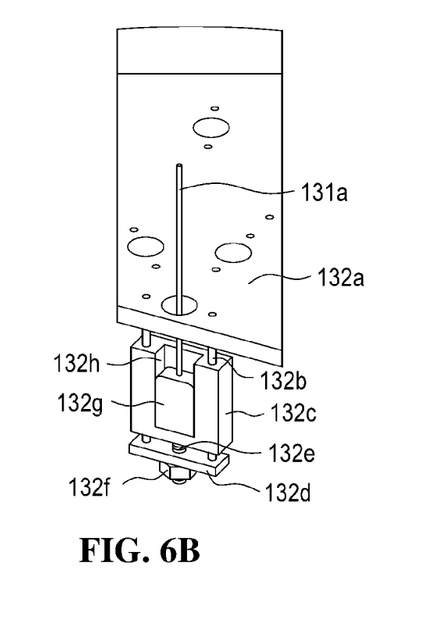
Figure 7:
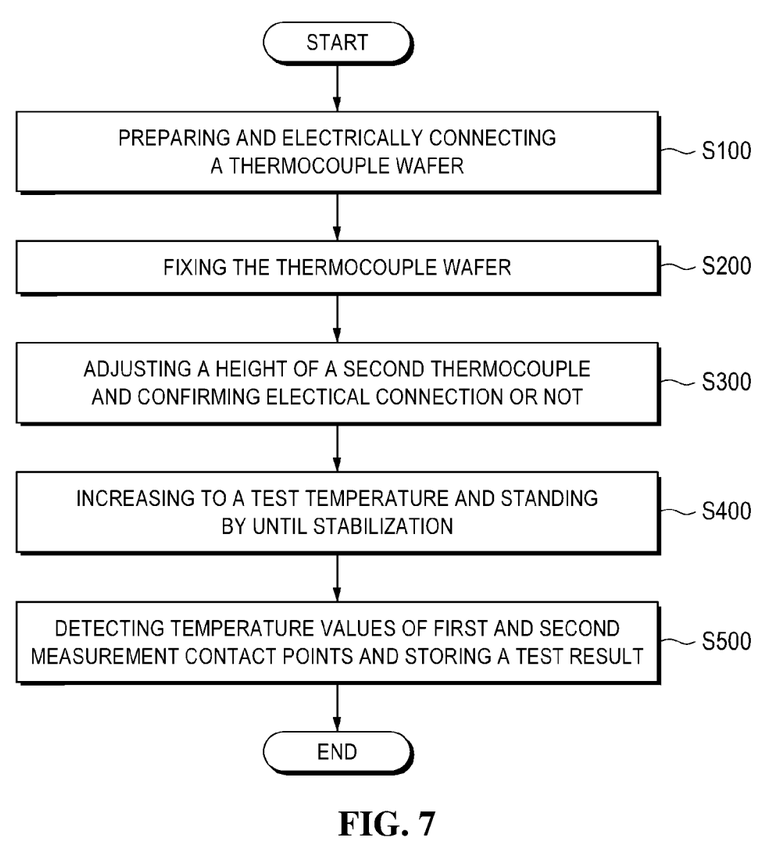
FIG. 7 is a flowchart schematically showing a calibration method using a thermocouple wafer calibration system according to an embodiment of the present disclosure.

FIG. 2 is a schematic view showing configuration of a thermocouple wafer calibration system according to an embodiment of the present disclosure. FIG. 3 is an exemplary image showing actual use of the thermocouple wafer calibration system according to FIG. 2. FIG. 4 is an image showing the inside of a chamber in the thermocouple wafer according to FIG. 3. FIG. 5 is a drawing showing arrangement of first and second measurement contact points and second thermocouples on a thermocouple wafer in a thermocouple wafer calibration system. FIGS. 6A and 6B are drawings showing configuration of a height adjustment unit in a thermocouple wafer calibration system. FIG. 7 is a flowchart schematically showing a calibration method using a thermocouple wafer calibration system according to an embodiment of the present disclosure.

As shown in FIG. 1 to FIG. 4, a thermocouple wafer calibration system 100 according to the present disclosure may include a main body portion 110, a thermocouple wafer 120, a calibration portion 130, a temperature measurement portion 140, a heating portion 150, a measurement portion 160 and a temperature control portion 170.

The main body 110 may be composed of a chamber 111 forming a sealed space, and a support 112 installed a lower edge of the chamber and supporting the chamber to be spaced apart from the ground.

The chamber 111 may be composed of a cylindrical body 111a accommodating a heater to be described hereinafter, various types of temperature sensors and a jig inside a container of which interior is filled with an insulation material I, and a cover 111b made of the insulation material I so as to cover an open upper side of the body 111a.

In the body 111a of this chamber 111, a horizontal support bar S of wafer, made of a ceramic material may be provided in plural numbers so as to adjust a position of a thermocouple wafer 120 to be described hereinafter on the plane and movement thereof. A lead wire connection hole H may be provided which has penetrated one side of a wall, and through which a thermocouple wafer lead wire L1 to be described hereinafter may go from the inside to the outside. Wherein, two or three of the lead wire connection holes H may be installed according to the number of the thermocouple wafer lead wire L1. The thermocouple wafer lead wire L1 is put inside the lead wire connection hole H, and then an insulation material is filled in a space therebetween, allowing minimizing heat loss.

The thermocouple wafer 120 may be composed of a plate 121 installed to be horizontal inside the sealed space of the chamber, and a first thermocouple unit 122 attached to a upper surface of the plate 121 so as to form a plurality of first measurement contact points P1.

The plate 121 is preferably a circular silicon substrate having a diameter ranging from 200 mm to 300 mm, and the first measurement contact point P1 signifies a specific point where a temperature is read.

The calibration portion 130 may be provided with a second thermocouple 131 unit penetrating the chamber 111 in a space where the chamber 111 spaced from the ground, then partially accommodated inside the sealed space, and calibrated to form a plurality of second measurement contact points P2 in contact with a lower surface of the plate 121 at a position corresponding to each of the first measurement contact points P1, and may further include a height adjustment unit 131 to adjust a height of the second thermocouples 131.

The second thermocouple unit 131 may be composed of a plurality of second thermocouples 131a, adjusting each height thereof by the height adjustment unit 131, and may be optionally separated from the lower surface of the plate 121. Wherein, the body 111a of the chamber 111 may be further provided with a metal tube T installed inside a hole that is formed by piercing from a lower surface of the body 111a to an entry of the sealed space so as to position the second thermocouple 131a at a more accurate position, when calibrating (installing) the thermocouple 131a.

The second thermocouple 131a is a thermocouple for calibration installed for the purpose of measuring a temperature of the thermocouple wafer 120, manufactured by putting a type B or R thermocouple wire in a twin bore ceramic insulator having a diameter of 1.5 mm to 2 mm. The bore used herein has a diameter of 0.4 mm to 0.5 mm and a length of 200 mm to 250 mm, and a thickness of the thermocouple wire is 0.1 to 0.2 mm.

The opposite side of the second measurement contact point P2 of the second thermocouple 131a may be connected to a commercialized quick connector 132g to be described hereinafter and then used. The second measurement contact point P2 is a contact point formed by joining two polar lines of the second thermocouple 131a and is coated with a high-temperature coating agent to prevent contamination resulting from direct contact between the second thermocouple 131 and the plate 121.

Meanwhile, referring to FIG. 5, the first and second measurement contact points P1 and P2 are arranged at a predetermined interval on the plate 121. This arrangement of the first and second measurement contact points P1 and P2 is positioned on a concentric circle having respective radii, r1, r2 and r3, on the basis of a center. In a concentric circle having the radii, r1 and r2, the arrangement thereof is positioned on the concentric circle at an angle interval of 45 degrees. In a concentric circle having the radius, r3, the arrangement thereof is positioned on the concentric circle at an angle interval of 22.5 degrees.

In additional, the radii r1 to r3 are set corresponding to a size of the plate. When a diameter of the plate is 300 mm, the radii, r1, r2 and r3 are set to 46.7 mm, 2×r1=93.4 mm and 32×r1=140.1 mm, respectively. Accordingly, each number of the first and second measurement contact points and the second thermocouples is preferably maximum 33.

A height adjustment unit 132 is installed in the space where the chamber 111 is spaced apart from the ground and then supports a lower part of the second thermocouple 121a so as to allow upward pressurization. This also performs a function to adjust each height of the second thermocouples 131a individually depending on the pressurization or not. The height adjustment unit 132 is made of an aluminum alloy based material and referring to FIGS. 6A and 6B, includes a support panel 132a, a fixation bar 132b, a guider 132c, separation panel 132d, a bolt 132e and a nut 132f.

The support panel 132a is installed spaced apart from the ground, forming a guide hole (not illustrated) through which the second thermocouple 131a passes movably up and downward. This is preferably formed in a circular shape.

A couple of the fixation bars 132b preferably extend downward from a bottom of the support panel 132a at a position corresponding to the guide hole.

The guider 132c is coupled to the fixation bar movably up and downward and a lower end part of the second thermocouple 131a may be attached thereto.

The separation panel may be coupled to a lower end of the fixation bar 132b being perpendicular to the fixation bar 132b.

The bolt 132e preferably penetrates the separation panel 132d and is couple to a lower end of the guider 132c.

The nut 132f is coupled to a lower end part of the bolt 132e on an opposite side where the guider 132c is positioned on the basis of the separation panel 132d. The nut 132f either rises or descends a height of the bolt 132e according to a rotation direction resulting from an external force, allowing pressurizing and moving the guider 132c and the second thermocouple 131a en bloc. The nut 132f ultimately performs a function to adjust the height of the second thermocouple 131a. A range of changes in height by the nut 132f may be set to within 1 cm to 2 cm.

Furthermore, the above-described height adjustment unit 132 may further include a quick connector 132g attached to the lower end of the second thermocouple, a seating groove 132h formed in the guider so as to correspond to the shape of the quick connector and on which the quick connector is seated and an adjustment bar 132i installed to an edge of the support panel 132a, supporting the support panel 132a to be spaced apart from the ground and allowing adjusting a height of the supported support panel 132a.

The temperature measurement portion 140 is partially accommodated inside the sealed space of the chamber 111 and performs a function to measure a temperature of the sealed space.

Many different types of thermocouples well known may be applied to this temperature measurement portion 140.

The heating portion 150 is accommodated inside the sealed space of the chamber 111, allowing thermogenesis. The heating portion 150 performs a function of being in thermal contact with the second thermocouple unit 131 directly. This may include a heater 151 in which a groove is formed on a ceramic block made on a lower surface of the chamber 111 and a helically wound coil is inserted into the groove, and a heater block 152 having a planar shape, which is made of a ceramic material and in which a wire of the heater 151 is installed.

Wherein, the heater 151 is configured to rise a temperature to maximum 1100° C.

The measurement portion 160 is connected to the first and second thermocouple units 122, 131 respectively, and performs a function to measure each thermal electromotive force for the first and second measurement contact points P1, P2 occurring when the first and second thermocouple units 122, 131 are in contact indirectly at both sides on the basis of the plate 121. Wherein, the connection between the measurement portion 160 and the first and second thermocouple units 122, 131 may be made by including the thermocouple wafer lead wire L1, a thermocouple wafer extension line L2, a second thermocouple extension line L3, a lead wire connector C1 and a connector for extension line connection C2.

The thermocouple wafer lead wire L1 is a thermocouple wire attached so as to extend from the first thermocouple unit 122 to the lead wire connector C1. The thermocouple extension line L2 is an extension line connecting the lead wire connector C1 and the measurement portion 160. The second thermocouple extension line L3 is a thermocouple extension line extending so as to be suitable for the type of the second thermocouple 131a.

Further, the lead wire connector C1 is an electrical connector electrically connecting the thermocouple wafer lead wire L1 and the thermocouple extension line L2. The connector for extension line connection C2 allows the second thermocouple extension line L3 not to be directly connected to the measurement portion 160 but one end thereof to pass, so as to separate the measurement portion 160 from the thermocouple wafer calibration system 100.

The temperature control portion 170 calculates each temperature value for the first and second measurement contact points P1, P2 depending on values measured from the above-described measurement portion 160. The temperature portion 170 compares and analyzes the calculated temperature values and temperature values measured from the temperature measurement portion 140 and then collects and stores data thereof. The temperature control portion 170 preferably controls an operation of the heating portion 150 based on the analyzed result so as to adjust the temperature of the sealed space.

This temperature control portion 170 may include a control PC 171 and a temperature adjustor 172. The main body portion 110 further includes a control box 113 installed in between the support 112 and the ground into a case form. The temperature adjustor 172 is fitted to this control box 113 together with a device including an ammeter, a voltmeter and a power switch, etc. Meanwhile, according to the present disclosure, a calibration method of an output temperature of a thermocouple wafer using a thermocouple wafer calibration system may include steps of: a) placing an arbitrary thermocouple wafer selected for test on a second measurement contact point, exposing thermocouple wafer lead wires extending from a first thermocouple unit to the outside through a hole for lead wire provided in a chamber, and then individually connecting the lead wires to a lead wire connector S100; b) after adjusting directions and positions of first and second measurement contact points so as for 1:1 correspondence, fixing the thermocouple wafer to a horizontal support bar provided in a chamber so as not to change the adjusted directions and positions S200; c) adjusting each height of second thermocouples, confirming that the second measurement contact point is in contact with a lower surface of a plate of the thermocouple wafer, and confirming that the thermocouple wafer lead wires are electrically connected to the lead wire connector S300; d) after sealing the chamber, increasing a temperature of a sealed space inside the chamber to a test temperature, and when the temperature of the sealed space has reached to the test temperature, standing by until a middle temperature value of the second measurement contact point is stabilized S400; and e) after stabilization of the temperature value of the second measurement contact point, conducting a test in which a computer detects temperature values depending on positions of the first measurement contact point in order, as well as temperature values depending on positions of the second measurement contact point in order, and storing a result of the conducted test and using the stored result for data analysis S500.

The step d) S400 may be standing by until the temperature value of the second measurement contact point is stabilized within maximum −0.1° C. to +0.1° C. per hour. In the step c) S500, detections of a series of temperature values depending on positions of the first and second measurement contact points may be repeated minimum 3 times individually.

As mentioned above, the detailed description for the disclosed preferable embodiments of the present disclosure was provided in order to be easily implemented by those skilled in the art. In the above, the preferable embodiments of the present disclosure were explained with reference to the accompanying drawings, it will apparent for those skilled in the art that various changes and modification are allowable within the scope of the present disclosure. For example, those skilled in the art are able to use the respective configurations described in the aforementioned embodiments in a way of combining the same with each other. Thus, the present disclosure is not limited to the embodiments shown in this application, but granting the widest scope coinciding with principals and novel features disclosed herein.

The present disclosure may be rectified to different specific forms within the scope of the spirit and essential features. Thus, the above detailed description should not be understood limitedly in all aspects but should be considered as examples. The scope of the present disclosure should be determined by interpreting accompanying claims rationally, and includes all modifications within the equivalent scope of the present disclosure. The present disclosure is not limited to the embodiments shown in this application, but granting the widest scope coinciding with principals and novel features disclosed herein. Further, the present disclosure may configure embodiments by combining claims which are not in explicit citation relationship in the patent scope or may include new claims through amendments following filing this application.

FIGURE REFERENCE NUMBERS

100: thermocouple wafer calibration system
110: main body portion
111: chamber
111a: body
111b: cover
112: support
113: control box
120: thermocouple wafer
121: plate
122: first thermocouple unit 130: calibration portion
131: second thermocouple unit
131a: second thermocouple
132: height adjustment unit
132a: support panel
132b: fixation bar
132c: guider
132d: separation panel
132e: bolt
132f: nut
132g: quick connector
132h: seating groove
132i: adjustment bar
140: temperature measurement portion
150: heating portion
151: heater
152: heater block
160: measurement portion
170: temperature control portion
171: control PC
172: temperature adjustor
I: insulation material
S: horizontal support bar
H: lead wire connection hole
T: tube
P1: first measurement contact point
P2: second measurement contain point
L1: thermocouple wafer lead wire
L2: thermocouple wafer extension line
L3: second thermocouple extension line
C1: lead wire connector
C2: connector for extension line connection

The invention claimed is:

1. A thermocouple wafer calibration system comprising:
a main body portion composed of a chamber forming a sealed space, and a support installed a lower edge of the chamber and supporting the chamber to be spaced apart from the ground;
a thermocouple wafer composed of a plate installed to be horizontal inside the sealed space of the chamber, and a first thermocouple unit attached to a upper surface of the plate so as to form a plurality of first measurement contact points;
a calibration portion provided with a second thermocouple unit penetrating the chamber in a space where the chamber spaced from the ground then partially accommodated inside the sealed space, and calibrated to form a plurality of second measurement contact points in contact with a lower surface of the plate at a position corresponding to each of the first measurement contact points;
a temperature measurement portion partially accommodated inside the sealed space of the chamber and measuring a temperature of the sealed space;
a heating portion accommodated inside the sealed space of the chamber, allowing thermogenesis and being in thermal contact with the second thermocouple unit directly;
a measurement portion connected to the first and second thermocouple units respectively, and measuring each thermal electromotive force for the first and second measurement contact points occurring when the first and second thermocouple units are in contact indirectly at both sides on the basis of the plate; and
a temperature control portion calculating each temperature value for the first and second measurement contact points depending on values measured from the measurement portion, and, after comparing and analyzing the calculated temperature values and temperature values measured from the temperature measurement portion, allowing adjusting the temperature of the sealed space by controlling the heating portion based on the analysis result, wherein
the second thermocouple unit is composed of a plurality of second thermocouples, allowing adjusting each height thereof, and optionally separated from a lower surface of the plate.

2. The thermocouple wafer calibration system of claim 1, wherein
the calibration portion further comprises a height adjustment unit installed in the space where the chamber is spaced apart from the ground then supporting a lower part of the second thermocouple so as to allow upward pressurization, and adjusting the each height of the second thermocouples individually depending on the pressurization or not.

3. The thermocouple wafer calibration system of claim 2, wherein
the height adjustment unit comprises:
a support panel installed spaced apart from the ground, forming a guide hole through which the second thermocouple passes movably up and downward;
a couple of fixation bars extending downward from a bottom of the support panel at a position corresponding to the guide hole;
a guider coupled to the fixation bar movably up and downward, wherein a lower end part of the second thermocouple is attached thereto;
a separation panel coupled to a lower end of the fixation bar being perpendicular to the fixation bar;
a bolt penetrating the separation panel and coupled to a lower end of the guider; and
a nut coupled to a lower end part of the bolt on an opposite side where the guider is positioned on the basis of the separation panel, and either rising or descending a height of the bolt according to a rotation direction resulting from an external force as so to pressurize and move the guider and the second thermocouple en bloc, ultimately allowing adjusting the height of the second thermocouple.

4. The thermocouple wafer calibration system of claim 3, wherein
the height adjustment unit further comprises:
a quick connector having a block form and attached to the lower end of the second thermocouple; and
a seating groove formed in the guider so as to correspond to the shape of the quick connector and on which the quick connector is seated.

5. The thermocouple wafer calibration system of claim 3, wherein
the height adjustment unit further comprises an adjustment bar installed to an edge of the support panel, supporting the support panel to be spaced apart from the ground and allowing adjusting a height of the supported support panel.

6. The thermocouple wafer calibration system of claim 1, wherein
the plate is a circular silicon substrate having a diameter ranging from 200 mm to 300 mm, and
the first and second measurement contact points are arranged at a predetermined interval on the plate.

7. The thermocouple wafer calibration system of claim 6, wherein
arrangement of the first and second measurement contact points is positioned on a concentric circle having respective radii, r1, r2 and r3, on the basis of a center,
in a concentric circle having the radii, r1 and r2, the arrangement thereof is positioned on the concentric circle at an angle interval of 45 degrees,
in a concentric circle having the radius, r3, the arrangement thereof is positioned on the concentric circle at an angle interval of 22.5 degrees, and
the radii r1 to r3 are set corresponding to a size of the plate.

8. The thermocouple wafer calibration system of claim 7, wherein
when a diameter of the plate is 300 mm,
the radii, r1, r2 and r3 are set to 46.7 mm, 2×r1=93.4 mm and 32×r1=140.1 mm, respectively, and
each number of the first and second measurement contact points and the second thermocouples is maximum 33.

9. A calibration method of an output temperature of a thermocouple wafer using a thermocouple wafer calibration system comprising steps of:
a) placing an arbitrary thermocouple wafer selected for test on a second measurement contact point, setting thermocouple wafer lead wires extending from a first thermocouple unit to be headed upward, allowing exposure thereof to the outside through a hole for lead wire provided in a chamber, and then individually connecting the lead wires to a lead wire connector;
b) after adjusting directions and positions of first and second measurement contact points so as for 1:1 correspondence, fixing the thermocouple wafer to a horizontal support bar provided in a chamber so as not to change the adjusted directions and positions;
c) adjusting each height of second thermocouples, confirming that the second measurement contact point is in contact with a lower surface of a plate of the thermocouple wafer, and confirming that the thermocouple wafer lead wires are electrically connected to the lead wire connector;
d) after sealing the chamber, increasing a temperature of a sealed space inside the chamber to a test temperature, and when the temperature of the sealed space has reached to the test temperature, standing by until a middle temperature value of the second measurement contact point is stabilized; and
e) after stabilization of the temperature value of the second measurement contact point, conducting a test in which a computer detects temperature values depending on positions of the first measurement contact point in order, as well as temperature values depending on positions of the second measurement contact point in order, and storing a result of the conducted test and using the stored result for data analysis.

\* \* \* \* \*